United States Patent [19]

Oxenham

[11] 4,143,571
[45] Mar. 13, 1979

[54] ASSEMBLIES FOR WORKPIECE POSITIONING

[75] Inventor: John Oxenham, Newbury, England

[73] Assignee: Blackman Martin Group Limited, Swindon, Wiltshire, England

[21] Appl. No.: 790,556

[22] Filed: Apr. 25, 1977

[30] Foreign Application Priority Data

Apr. 26, 1976 [GB] United Kingdom ............... 16800/76

[51] Int. Cl.² ............................................. B26F 1/02
[52] U.S. Cl. ...................................... 83/412; 33/1 M; 83/552; 83/916
[58] Field of Search ................. 83/409, 410, 414, 916, 83/552, 412; 33/1 M, 23 C

[56] References Cited

U.S. PATENT DOCUMENTS

| | | | |
|---|---|---|---|
| 3,058,380 | 10/1962 | Leibinger | 83/410 |
| 3,174,378 | 3/1965 | Friedland et al. | 83/552 X |
| 3,230,810 | 1/1966 | Kihlstrom et al. | 83/410 |
| 3,434,212 | 3/1969 | Kleine et al. | 33/23 C |
| 3,563,123 | 2/1971 | Leibinger | 83/237 |
| 3,603,187 | 9/1971 | Bredow | 83/409 |
| 3,717,061 | 2/1973 | Daniels | 83/409 |
| 3,839,936 | 10/1974 | Daniels | 83/410 |

*Primary Examiner*—J. M. Meister
*Attorney, Agent, or Firm*—Schuyler, Birch, Swindler, McKie & Beckett

[57] ABSTRACT

A workpiece positioning assembly for a machine tool has first and second traverses mounted perpendicular to one another. The second traverse is unsupported at its ends and mounted intermediate its ends upon the first traverse for horizontal movement in a direction perpendicular to the axis of the second traverse. The second traverse has a carriage movable therealong for supporting a workpiece and effecting movement in a direction parallel to the axis of the second traverse. The workpiece positioning assembly is preferably applied to a punch press.

3 Claims, 6 Drawing Figures

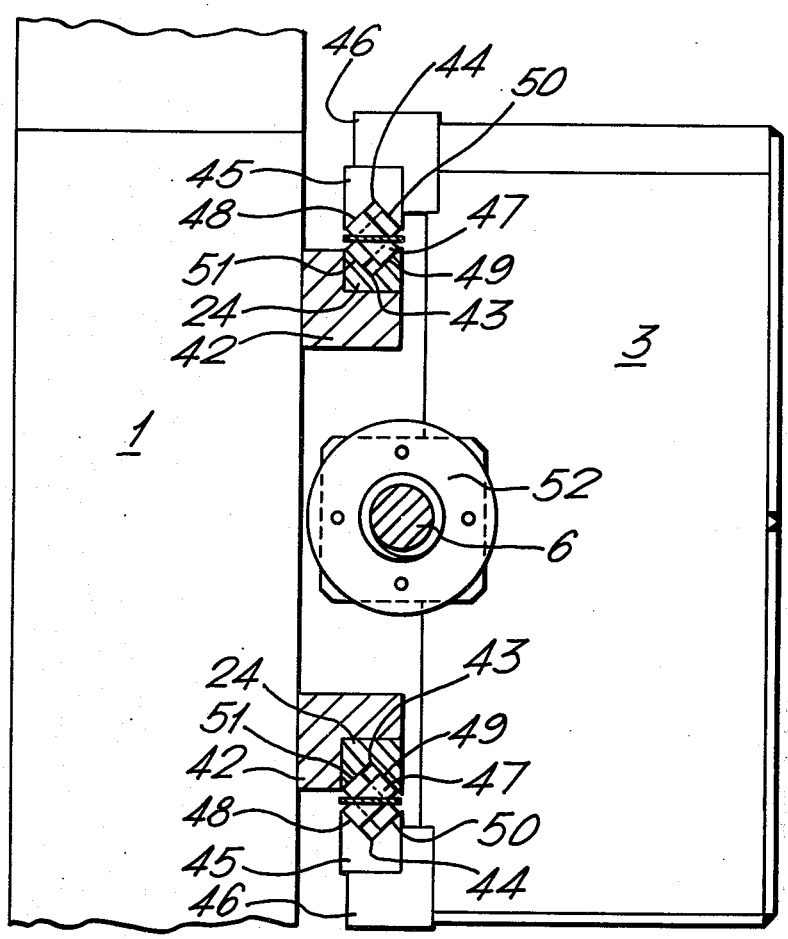

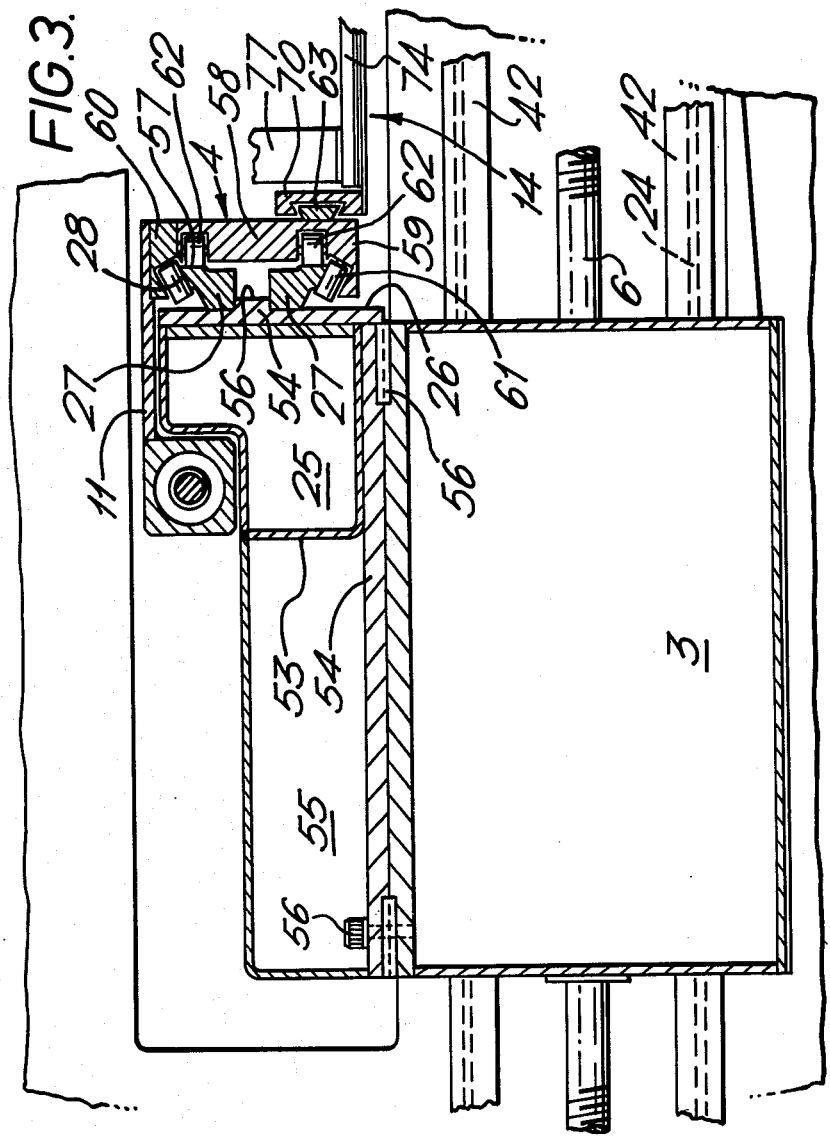

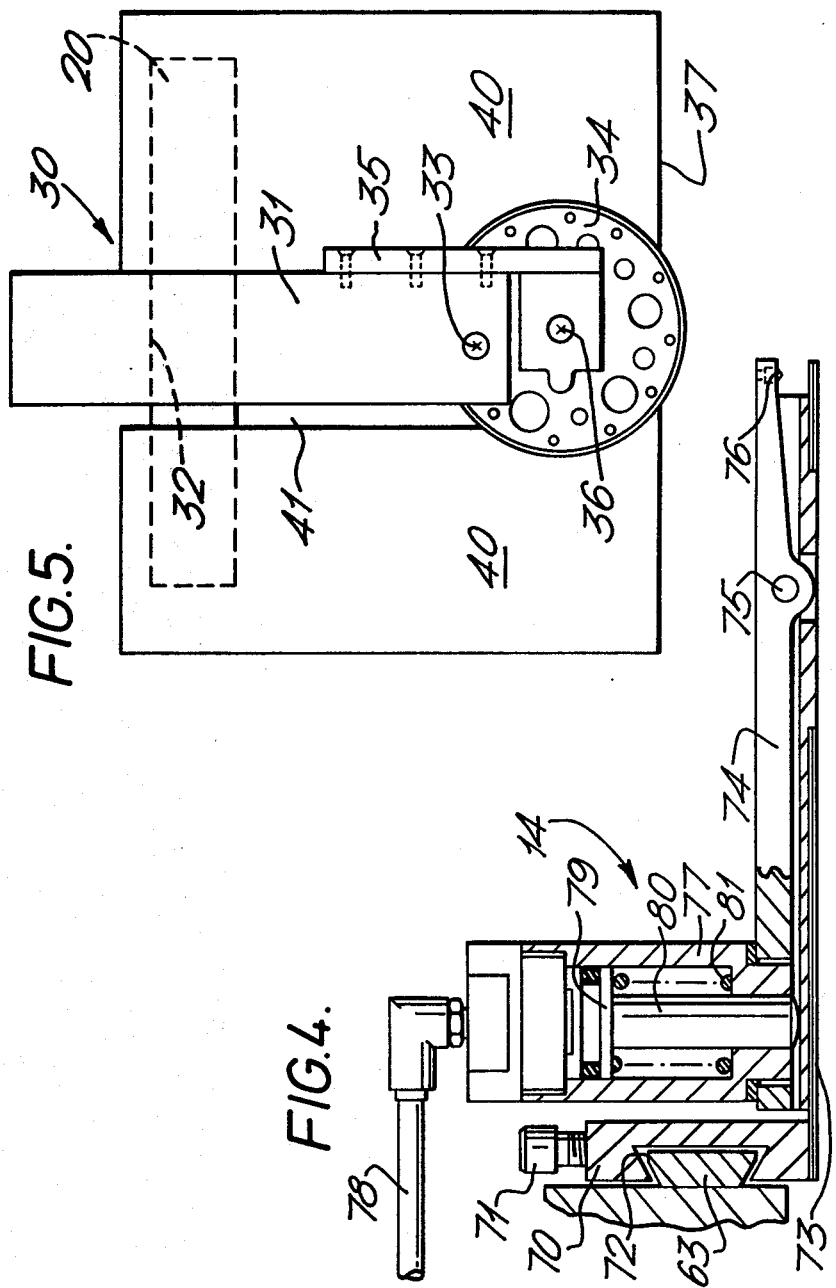

ASSEMBLIES FOR WORKPIECE POSITIONING

FIELD OF THE INVENTION

This invention relates to an improved workpiece positioning assembly.

The workpiece positioning assembly is particularly useful when forming part of a single-hole or multiple-hole punch press and, although not restricted in scope to use solely with a punch press, will be described through this specification in conjunction with a punch press by way of example.

BRIEF DISCUSSION OF THE PRIOR ART

Existing punch presses usually include a frame having an upper and lower limb defining a throat therebetween. The punch assembly for punching a hole in a sheet of metal is carried by the upper limb and an aligned die assembly is carried by the lower limb. In order to move a sheet of metal relative to the punch so that more than one hole may be punched without lifting the sheet from the press the sheet of metal is clamped to a movable traverse in the form of a beam which extends at right angles to the axis of the throat of the press. The beam is movable in the axial direction of the throat and is supported at each of its ends by a bearing bar which extends parallel to the axis of the throat. Such an arrangement allows movement in the one direction; movement in a right-angled direction being provided by a movable carriage supported on horizontally spaced bearing bars and to which the sheet is clamped.

SUMMARY OF THE PRESENT INVENTION

According to the present invention we provide a workpiece positioning assembly for a machine tool comprising a first traverse, a second elongate traverse unsupported at its ends and mounted intermediate its ends upon the first traverse for horizontal movement in a direction perpendicular to the axis of the second traverse, and a workpiece support movable in a direction parallel to the axis of the second traverse.

Preferably each traverse includes two parallel vertically-spaced tracks and a parallel lead screw.

The invention also includes a punch press comprising a frame having an upper limb and a lower limb defining a throat therebetween, a first traverse on the frame and extending in a direction parallel to the throat, a second elongate traverse, unsupported at its ends, mounted intermediate its ends upon the first traverse for horizontal movement in a direction perpendicular to the axis of the second traverse, and a workpiece support movable along the second traverse.

Preferably both the first and second traverses comprise vertically spaced tracks, the first traverse being mounted along one side of the lower limb of the frame and the second traverse being normally disposed within the back of the throat. As an alternative the first traverse may consist of a track mounted on each side of the lower limb so that the second traverse is substantially centrally supported upon an inverted U-shaped carriage which straddles the lower limb of the frame.

A particularly advantageous arrangement is when the workpiece positioning assembly is used in conjunction with a turret punch. Therefore according to a further preferred feature of the invention the punch press includes a rotatable upper turret supported by the upper limb of the frame and a ram mounted in the frame for axial movement, the turret and ram being so disposed relative to one another that the path of movement of the periphery of the turret lies at or adjacent the front edge of the press and that the ram is disposed coaxially with and above a punch station of the turret at or adjacent the back of the turret when viewed from the front of the press.

Preferably the workpiece positioning assembly is numerically controlled or controlled in another suitable programmable manner but may be manually operable if desired.

BRIEF DESCRIPTION OF THE DRAWINGS

The invention will now be described by way of example with reference to the accompanying drawings which illustrate one embodiment of the invention and in which:

FIG. 2 is an end view of the Y-axis slide in the direction of arrow A in FIG. 1;

FIG. 3 is a sectional view on the line 3—3 in FIG. 1;

FIG. 4 is a sectional side elevation of a clamp assembly;

FIG. 5 is a diagrammatic plan view of the turret punch of FIG. 6 showing its novel configuration.

DESCRIPTION OF THE PREFERRED EMBODIMENTS

Figure 1:
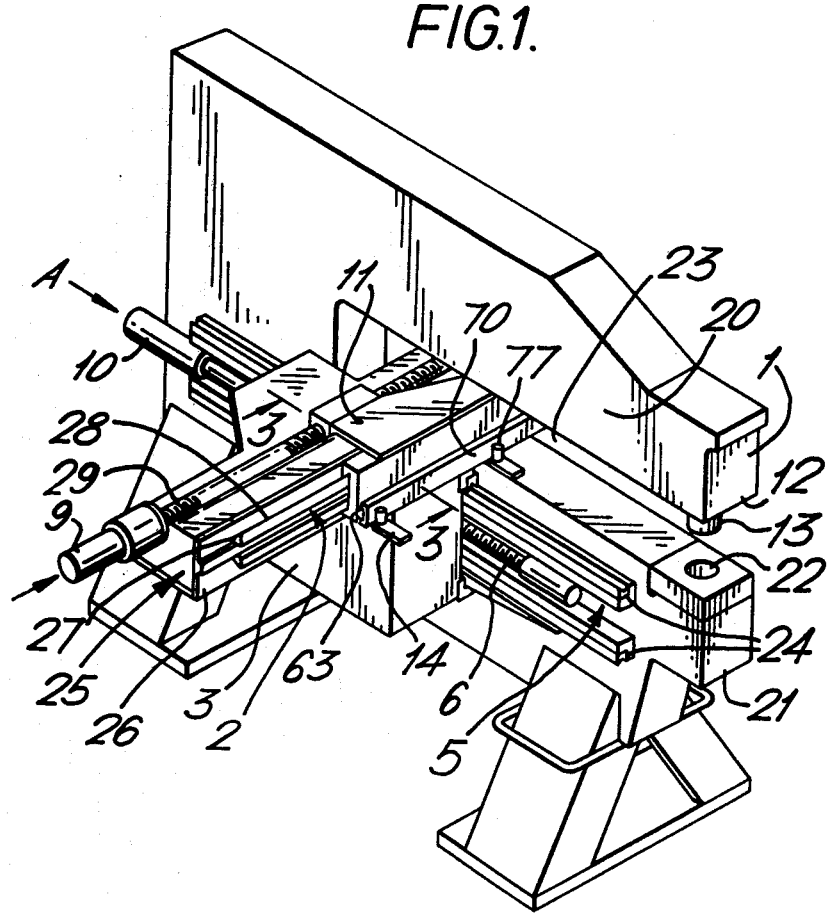
FIG. 1 is a perspective view of a preferred embodiment of workpiece positioning assembly disposed on a single hole punch press.

In the drawing of FIG. 1 a single hole punch press has a solid frame 1 of C-shape which has an upper limb 20 carrying a punch assembly 13 and a lower limb 21 carrying a die assembly 22. The upper limb 20 and lower limb 21 are spaced apart to define a throat 23 therebetween.

A first elongate traverse 5 along the Y-axis is secured to the lower limb 21 and consists of two vertically spaced rails 24 and a driven leadscrew 6. The driven leadscrew 6 has a driving connection with a slide 3, movable along the first traverse 5 in a direction parallel to the throat 23. The slide 3 forms a substantially centrally disposed bearing for a second elongate traverse 2 to support horizontal movement along the first traverse 5 in a direction perpendicular to the axis of the second traverse 2.

The second traverse 2 along the X-axis comprises a beam 25 to the front face 26 of which is secured a longitudinally extending guide means 8. The guide means 8 has two spaced rails 27 secured to the beam 25 so as to provide inwardly inclined longitudinal edges which define vertically-spaced upper and lower tracks 28. A workpiece support carriage 4 is mounted on the guide means 8 and has cam rollers see FIG. 3 which engage the tracks 28 and allow longitudinal movement of the carriage 4 along the beam 25. Movement of the carriage 4 along the beam 25 is controlled by a driving connection between a carriage link arm 11 and a driven leadscrew 29 which extends parallel to and is disposed behind the front face of the beam 25. The leadscrews for the first and second traverse are driven by motors 10 and 9 respectively as shown. The workpiece support carriage 4 includes two spaced workpiece clamps 14 which will be described in more detail below with reference to FIG. 4.

FIGS. 2, 3 and 4 show the workpiece positioning mechanism in more detail. FIG. 2 shows an end view of the Y-axis slide 3 and its sliding relationship with the traverse 5. The traverse 5 has two vertically spaced rails 24 which are secured to longitudinally extending flanges 42 formed integral with the main frame 1. The rails 24 each have a right-angled channel 43 which form the tracks for movement of the slide 3.

The slide 3, as shown, has confronting right-angled channels 44 in rails 45 which are secured to upper and lower longitudinal shoulders 46. In order to provide a bearing surface between the co-operating channels 43 and 44 caged roller bearings 47 are disposed between the channels. The roller bearings 47 are alternately arranged so that the bearing surfaces engage opposite faces of the channels 43 and 44 e.g. the upper track in FIG. 2 shows a roller bearing 47 engaging with opposite faces 48 and 49 whereas the adjacent roller bearing will engage the faces 50 and 51. The movement of the slide 3 is effected by the driven leadscrew 6 which has a driving connection with a sleeve, the head 52 of which is shown bolted to the body of the slide 3.

A section of the beam 25 and workpiece support carriage 4 is shown in FIG. 3. The beam 25 is generally of the section indicated by the dotted lines 53 and is hollow, defined by thick bottom and face sections 54 and thinner upper sections. At the point of section however the beam 25 has a wing portion 55 which is bolted and keyed to the upper face of the slide 3 (see bolts and keys 56) to provide the longitudinal movement of the beam perpendicular to its axis.

The front face 26 of the beam 25 has a longitudinal central ridge 56 which forms a spacer for the rails 27 referred to briefly in connection with FIG. 1. The rails 27 have a flat outer face 57 and are inwardly inclined to provide the upper and lower tracks 28 for the workpiece support carriage 4.

The workpiece support carriage 4 has a front plate 58, disposed substantially parallel to the front face 26 of the beam 25, a lower flanged edge 59 formed integral with the front plate 58 and a plurality of bearing blocks 60 (only one shown) secured to the upper edge of the front plate 58. The flanged edge 59 and bearing blocks 60 support angled roller bearings 61 which engage respectively the lower and upper tracks 28 along which the carriage 4 is movable. In addition to the roller bearings 61 the front plate 58 also includes a plurality of roller bearings 62 which engage the flat outer faces 57 of the rails 27. The provision of bearing blocks 60 allows the carriage 4 to be removed and also allows the pressure with which the roller bearings 61 engage the tracks 28 to be adjusted.

The outer face of the front plate 58 has a dove-tail strip 63 secured thereto on which the two workpiece clamps 14 are positioned. The detail of clamps 14 can be seen more clearly from FIG. 4.

The clamp 14 in FIG. 4 has a mounting plate 70 adapted to slidably engage the dove-tail strip 63 and is releasably secured in a desired position by locking nut 71 which engages a flat portion 72 on the dove-tail strip 63. A plate spring 73 extends perpendicularly away from the bottom of the mounting plate 70 and supports the clamp in such a way as to allow it to ride over the die assembly during use. The clamp itself comprises a clamping arm 74 pivotally mounted at 75 and having a tungsten tip 76 at its free end to bite into the workpiece being clamped. The other end of the clamping arm 74 is secured to a cylinder 77 which is adapted to receive compressed air through a pipe 78 to cause clamping of the arm 74. The cylinder 77 has a reciprocal piston 79 therein which includes a depending shaft 80 protruding through the bottom of the cylinder 77. On receipt of compressed air the piston 79 is forced down and the depending shaft 80 is caused to protrude further so as to engage the bottom of the clamp assembly. This causes the cylinder to be lifted effecting clockwise rotation of the clamping arm 74 thereby clamping a workpiece. On stopping the supply of the compressed air to the cylinder 77, the cylinder 77 is vented and it returns to its original position by its own weight and the piston 79 is returned by a return spring 81.

Referring now to FIG. 5 which diagrammatically illustrates the plan view of a turret punch with which the workpiece positioning assembly of the present invention may be used. A turret punch 30 comprises a C-shaped frame having an upper limb 31 which together with a spaced lower limb (not shown) defines a throat the back of which is indicated by dotted lines 32. The upper limb 31 supports a ram 33 mounted for axial movement and an upper turret 34. The upper turret 34 is mounted on one side of the upper limb 31 by support bracket 35 and is rotatable about an axis 36. Reference 37 indicates the front of the turret punch and thus it can be clearly seen from FIG. 5 that the ram is disposed coaxially above the extreme rear punch station. The particular disposition of the ram allows easy tool replacement at the front of the machine whilst all punching operations are effected at the furthest point from an operator thereby increasing the safety factor.

Figure 6:
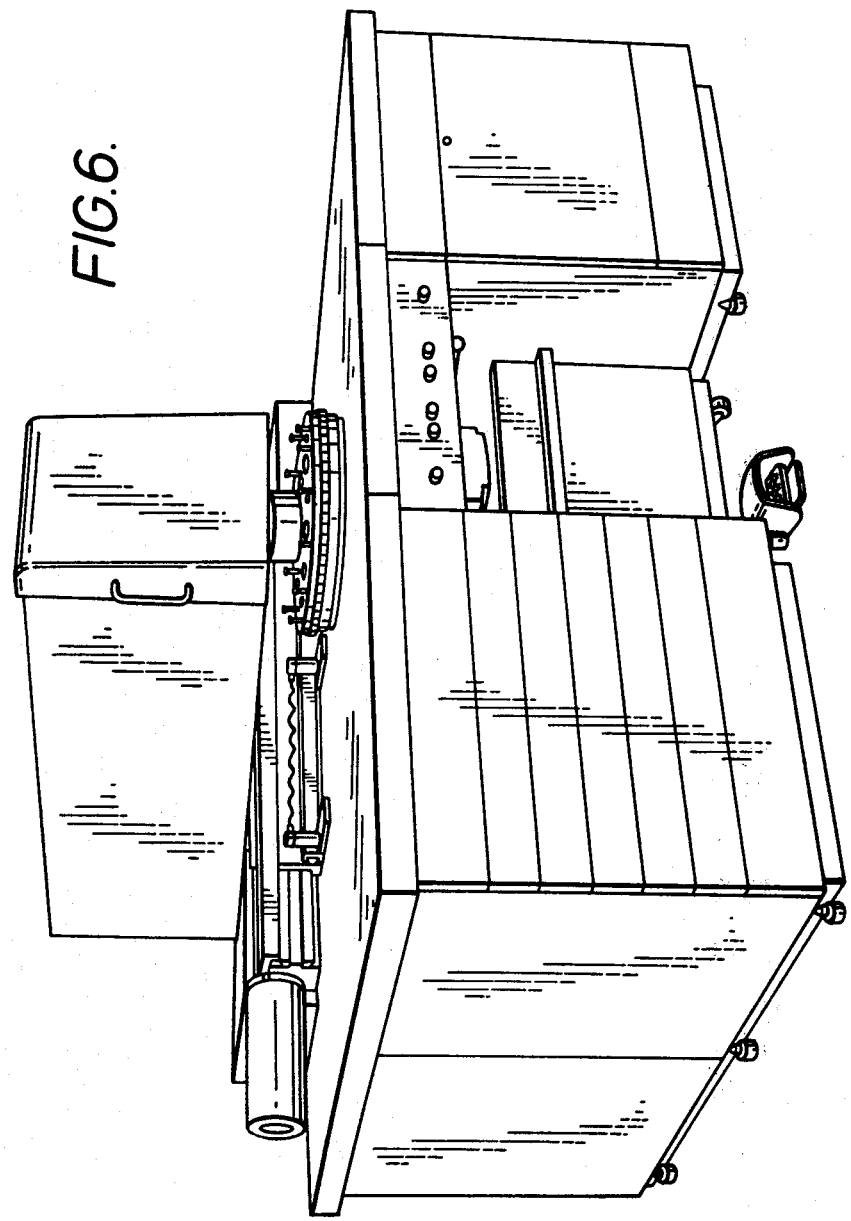
FIG. 6 is a perspective view of a preferred assembled embodiment.

The punch presses described, whether single hole or multihole presses, are provided with table sections 40 (see FIG. 5) which extend along both sides and at the front of the frame, a slot 41 of about 250 mm width being provided for access to the first traverse 5. Preferably the operation is numerically controlled and the N.C. control unit is mounted within one of the side table sections. FIG. 6 shows in perspective a preferred assembled embodiment which is a turret punch press which is numerically controlled. The specific details of the turret-punch indexing and assembly may be seen from our prior British Pat. Nos. 1420594 and 1420595.

I claim:

1. A punch press comprising a C-shaped frame having an upper limb and a lower limb defining a throat therebetween, a first traverse on the frame and extending in a direction parallel to the throat, said first traverse including two parallel vertically-spaced rails secured to the lower limb of the frame, said rails extending forwardly and rearwardly from the back of the throat to enable a maximum throat depth to be employed during punching and said rails being vertically-spaced by a distance sufficient to provide a bearing area extending over a major portion of the height of the lower limb of the frame to ensure maximum rigidity, a second elongate traverse including a bearing slide and two parallel vertically-spaced tracks, said bearing slide being disposed intermediate the ends of the second elongate traverse, said bearing slide being engaged upon the two parallel vertically-spaced rails of the first traverse thereby supporting the second elongate traverse only intermediate its ends, and said bearing slide extending rearwardly of the second elongate traverse so as to engage with the rearwardly extending portions of the rails of the first traverse to enable the second elongate traverse to be withdrawn to the back of the throat, a workpiece support mounted on the two parallel vertically-spaced tracks of the said second elongate traverse, a first driven leadscrew in driving connection with said second traverse for moving the second traverse along the two vertically-spaced rails of the first traverse in a direction perpendicular to the axis of the second traverse, said first driven leadscrew extending parallel to the two vertically-spaced rails of the first traverse, and said first driven leadscrew being disposed substantially centrally between the two rails of first traverse to aid in balancing the bearing forces acting upon the two rails, and a second driven leadscrew in driving connection with the said workpiece support for moving the workpiece support along the second traverse, said second driven leadscrew extending parallel to the two vertically spaced tracks of the second traverse.

2. A punch press according to claim 1 wherein the press is a turret punch press and includes a rotatable upper turret supported by the upper limb and a ram mounted in the frame for axial movement, the turret and ram being so disposed relative to one another that the path of movement of the periphery of the turret lies at or adjacent the front edge of the press and the ram is disposed coaxially with and above a punch station of the turret at or adjacent the back of the turret when viewed from the front of the press.

3. A punch press according to claim 1 wherein the movement of the second traverse upon said first traverse and the movement of the workpiece support upon said second traverse is numerically controlled.

* * * * *